United States Patent [19]

Hingorani

[11] 4,164,772
[45] Aug. 14, 1979

[54] AC FAULT CURRENT LIMITING CIRCUIT

[75] Inventor: Narain G. Hingorani, Los Altos Hills, Calif.

[73] Assignee: Electric Power Research Institute, Inc., Palo Alto, Calif.

[21] Appl. No.: 897,040

[22] Filed: Apr. 17, 1978

[51] Int. Cl.² ............................................. H02H 9/02
[52] U.S. Cl. ........................................ 361/58; 323/9; 361/2; 361/9; 361/11; 361/16
[58] Field of Search ...................... 361/2–4, 361/6, 8–11, 13–17, 58; 323/9

[56] References Cited

U.S. PATENT DOCUMENTS

| | | | |
|---|---|---|---|
| 3,809,959 | 5/1974 | Pucher | 361/13 X |
| 4,028,592 | 6/1977 | Fahlen et al. | 361/16 |
| 4,056,836 | 11/1977 | Knauer | 361/2 X |

FOREIGN PATENT DOCUMENTS 366966  2/1932  United Kingdom ...................... 361/13

*Primary Examiner*—Harry E. Moose, Jr.
*Attorney, Agent, or Firm*—Flehr, Hohbach, Test, Albritton & Herbert

[57] ABSTRACT

Circuitry for limiting the instantaneous peak current, under fault conditions, of an AC power line, includes a high speed circuit breaker in series with a first capacitor in a main current-carrying branch, which branch is paralleled by two additional branches. According to various embodiments these branches contain various combinations of resistance, capacitance and spark gap elements whereby upon occurrence of the excess fault condition, the high speed circuit breaker opens. Thereafter the voltage buildup across the first series capacitor is sequentially commutated to a second branch having a capacitor and spark gap, with a predetermined arc-over voltage, and subsequently to a third resistive branch. The third branch effectively provides the peak current limiting impedance.

7 Claims, 7 Drawing Figures

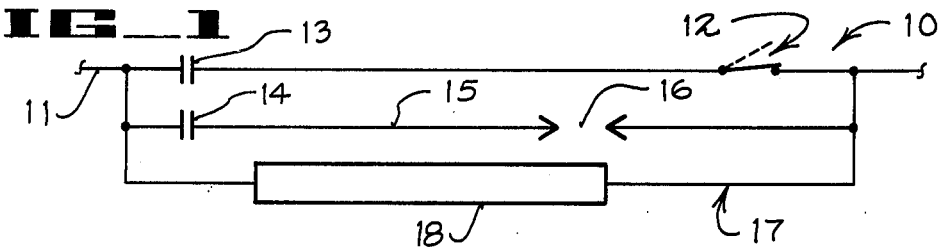
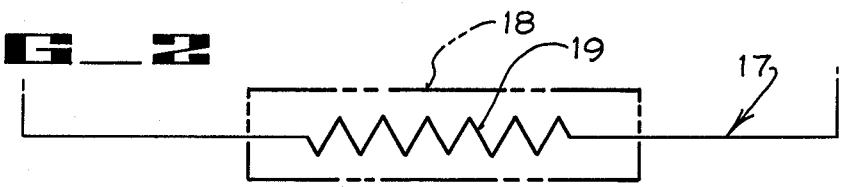
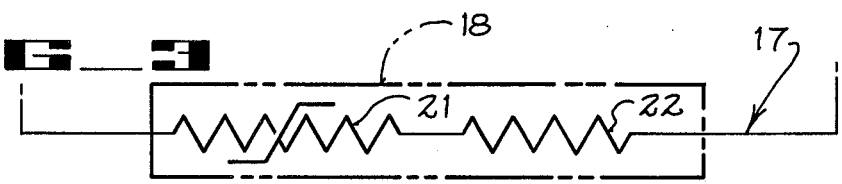
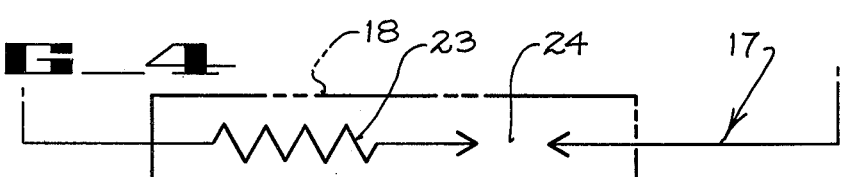
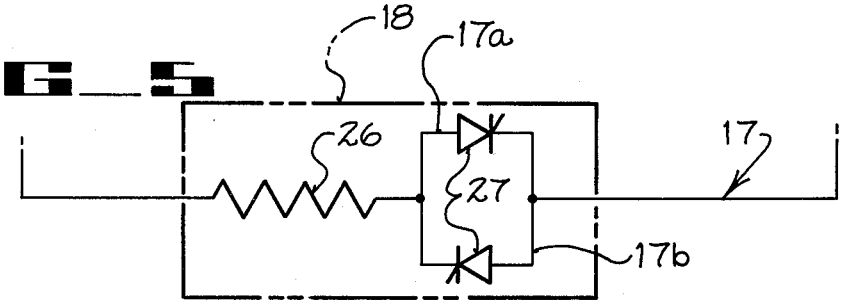
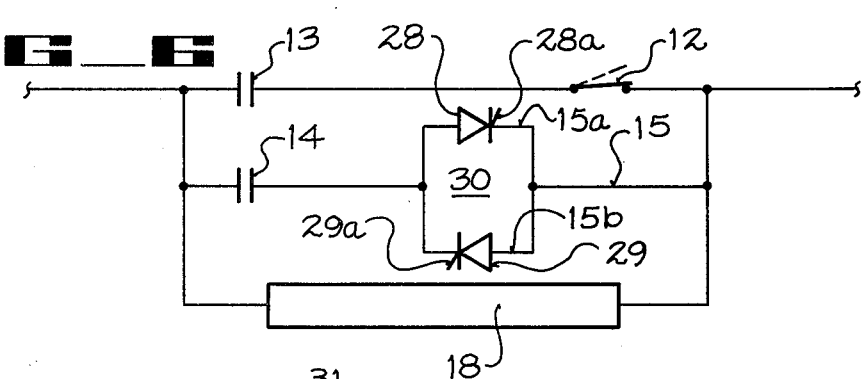
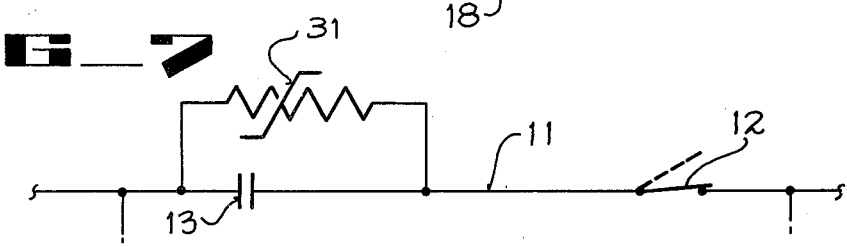

AC FAULT CURRENT LIMITING CIRCUIT

BACKGROUND OF THE INVENTION

This invention pertains to an AC fault current limiting circuitry.

AC fault current limiters are required in electrical power systems to rapidly insert an impedance into a system when a fault occurs. In this manner instantaneous peak current can be limited to a maximum permissible value. To be effective the impedance has to be inserted within a few milliseconds on the order of less than five milliseconds without the assistance of natural current zero in an AC system.

One of the presently known fault current limiters consists of a high speed main switch which, on opening, generates a very high voltage arc to commutate the fault current rapidly to a resistor. A capacitor is also usually included in parallel with the switch so as to facilitate commutation and limit the rate of rise of voltage across the switch. The main switch required for a scheme of this kind would require the ability to generate very high voltage. However, switches of this kind are not believed to be commercially available at this time.

OBJECTS OF INVENTION

Accordingly, it is an object of the present invention to provide a fault current limiter in which the high speed circuit breaker switch does not require means for generating a high voltage.

Another object of this invention is to provide a fault current limiter in which portions of the fault limiter circuitry constitute, in normal operation, portions of the power line to compensate for system inductance.

Other objects of the invention will become more readily evident from the following detailed description of preferred embodiments when considered in conjunction with the drawings.

BRIEF DESCRIPTION OF THE DRAWINGS

FIG. 1 shows a diagrammatic fault current limiter circuitry, according to a general embodiment of the invention;

FIGS. 2 through 5 each show a schematic view of electrical elements to be employed in branch 17 of the general embodiment of FIG. 1 in order to provide four different specific embodiments according to the invention when so employed;

FIG. 6 shows another embodiment according to the invention characterized by a thyristor circuit in the second branch thereof; and FIG. 7 shows a schematic view of electrical elements to be employed in branch 11 of the general invention of FIG. 1 or in any of the above embodiments to provide protection for capacitor 13.

SUMMARY OF THE INVENTION

In general there is disclosed a fault current limiter system involving three branches disposed in parallel in which one of the branches is the normal current-carrying branch consisting of a series capacitor and a high speed circuit breaker. A second branch consists of a capacitor in series with means serving to inhibit current flow from a source of voltage thereacross below a predetermined threshold and to break down in response to application of a voltage thereto in excess of the predetermined threshold for transmitting current via the second branch. The resistance means in the third branch serves to inhibit formation of a time constant in conjunction with the capacitor of the second branch during the time the capacitor in the first branch is discharging into the capacitor in the second branch so as to rapidly subject the circuit breaker switch to current zero.

DETAILED DESCRIPTION OF PREFERRED EMMBODIMENTS

In general, as shown in FIG. 1 an AC fault current limiting circuit 10 is provided for rapidly inserting a relatively large impedance into a circuit in response to a fault occurring in the main circuit line, such as line 11. The rapid insertion of an impedance into line 11 in response to sensing a fault serves to limit instantaneous peak current to a maximum permissible value. In order to be effective it has been observed that the impedance must be inserted within a few milliseconds of the order of less than five milliseconds without the help of natural current zero in an AC system.

As shown in FIG. 1 a high speed circuit breaker switch 12 of known type for responding to a fault and for suitably quickly opening the switch is disposed in series with a capacitor 13 in the normal current carrying line 11.

System 10 includes three branches disposed in parallel, the first being the normal current carrying line 11 including capacitor 13 and high speed circuit breaker 12 in series. A second branch 15 consists of a capacitor 14 in series with a spark gap 16 while a third branch 17 includes resistance means represented by the block 18.

As shown in FIGS. 2, 3, 4 and 5 resistance means 18 can take any of several forms. For example, in FIG. 2 means 18 simply includes a linear resistor 19. In FIG. 3 means 18 includes in series a non-linear resistor 21 and a linear resistor 22 for purposes described below.

As shown in FIG. 4, resistance means 18 comprises a linear resistor 23 in series with a spark gap 24. Finally, as shown in FIG. 5 reistance means 18 comprises a linear resistor 26 in series with a pair of oppositely oriented (back-to-back) silicon controlled rectifiers 27 disposed in parallel branches 17a, 17b of branch 17.

For an optimized design, the voltage rating of capacitor 13 and the spark-over voltage level of spark-gap 16 should be small compared to the voltage rating of capacitor 14, resistance means 18 and circuit breaker 12. When normal load current is flowing in branch 11, circuit breaker 12 is in a closed position, which provides a small AC voltage across capacitor 13 proportional to the current flow. This voltage is smaller than the spark-over voltage of spark-gap 16. When a fault occurs, instantaneous voltage across capacitor 13 rapidly rises in response to the increased current, circuit breaker 22 opens (with an arc defined across the contacts thereof). When the instantaneous voltages of capacitor 13 and circuit breaker 12 combine to equal the spark-over level of gap 16, gap 16 conducts and causes capacitor 13 to discharge into capacitor 14 causing current zero through circuit breaker 12 as the result of a reverse flow of current from capacitor 13 to capacitor 14. Accordingly, circuit breaker 12 ceases to conduct. The voltage across capacitor 14 rises rapidly with a proportional increase in current being transferred to resistance means 18 which, in the case of the resistor 19 in FIG. 2 is sized for limiting the fault current. Capacitor 14 also serves the purpose of limiting the rate of rise of voltage across circuit breaker 12.

Resistance means 18 of FIG. 3, when substituted into FIG. 1, includes the non-linear resistor 21 so that resistance means 18 does not begin to carry substantial current until after current zero is established in circuit breaker 12.

Thus, it is to be noted that the loading of capacitor 14 from capacitor 13 results in a reverse flow of current in branch 11 which reduces the current at circuit breaker 12 to zero.

As shown in FIG. 3 it is preferable to construct means 18 as a non-linear resistance 21 in series with a linear resistance 22. The presence of the non-linear resistor 21 prevents significant current from being transmitted therethrough until a significantly high voltage is reached across capacitor 14. Thus, initially there will be no RC time constant defined between capacitor 14 and resistor 21 to delay loading of capacitor 14. Yet after capacitor 14 is fully loaded a suitable resistance in branch 17 will be provided.

As shown in the embodiment of FIG. 4, provision of a second spark gap 24 in series with resistor 23 serves to preclude the formation of an RC time constant between capacitor 14 and resistor 23 with attendant delay in load capacitor 14.

An important advantage of system 10 is to be found in the fact that high speed circuit breaker 12 does not require a special switch for generating high voltage. Furthermore, capacitor 13 serves, in normal operation of branch 11, to compensate for system inductance.

According to another embodiment as shown in FIG. 6, the spark-gap 16 of FIG. 1 has been replaced by a pair of oppositely oriented (back-to-back) thyristors 28, 29 disposed in parallel branches 15a, 15b of branch 15 to provide precision firing. Accordingly, back-to-back thyristors 28, 29 are set to fire at a predetermined voltage setting in either polarity.

As shown in FIG. 4, branch 17 can also be employed to preclude the formation of an RC time constant defined between resistance means 18 and capacitor 14 as might otherwise cause delay in loading capacitor 14.

Thus, a spark gap 24 in series with resistor 23 serves to prevent any significant current from being transmitted via branch 17 until a sufficiently high voltage is reached across capacitor 14 as to "fire" the gap 24.

Yet another means for preventing the delay in loading capacitor 14 is provided in the embodiment shown in FIG. 5 wherein branch 17 includes resistor 26 in series with back-to-back SCR's 27 forming a thyristor circuit inhibiting current flow.

As shown in FIG. 7 branch 11 includes means serving to limit the peak current across capacitor 13 for protecting capacitor 13. Thus, a non-linear resistor 31 in parallel with capacitor 13 serves to provide a voltage drop across capacitor 13 in response to peak voltage applied thereto.

As noted generally above with respect to FIG. 6 SCR elements 28, 29 form a thyristor switch 30 which can be turned on upon reaching a voltage threshold across switch 30. Sensors for detecting a threshold voltage level can be coupled to the gate electrodes 28a, 29a for more precisely controlling the firing of the thyristor 30 (as compared to gap 16).

After current has been transferred from branch 11 to branch 15 and then to branch 17, thryistor 30 can be turned off by means of gate electrodes 28a, 29a and maintain capacitor 14 out of the circuit so as to reduce the duty on capacitor 14 and thereby reduce its size and hence its cost.

I claim:

1. An AC fault current limiting circuit for rapidly inserting sufficient impedance into a circuit in response to occurrence of a fault in the last named circuit for limiting instantaneous peak current to a maximum permissible value, said limiting circuit comprising first, second and third branches to be coupled in parallel, said first branch comprising a portion of the second named circuit, a first capacitor and a high speed circuit breaker switch disposed in series in said first branch, a second capacitor and means in series therewith in said second branch serving to inhibit current flow from a source of voltage thereacross below a predetermined threshold and to break down in response to application of a voltage thereto in excess of said predetermined threshold to transmit current via said second branch, and impedance means in said third branch serving to inhibit formation of a time constant in conjunction with said second capacitor as said first capacitor discharges into said second capacitor for quickly subjecting said circuit breaker switch to current zero.

2. An AC fault current limiting circuit according to claim 1 wherein said impedance means comprises in series a non-linear resistor and a linear resistor.

3. An AC fault current limiting circuit according to claim 1 wherein said impedance means comprises in series a resistor and a second spark gap.

4. An AC fault current limiting circuit according to claim 1 wherein said impedance means comprises in series a resistor and a pair of SCR devices disposed in parallel branches of said third branch, said SCR devices being oppositely oriented.

5. An AC fault current limiting circuit according to claim 1 wherein said means in said second branch comprises a pair of SCR devices disposed in parallel branches of said second branch, said SCR devices being oppositely poled to provide a thyristor.

6. An AC fault current limiting circuit according to claim 1 comprising means serving to limit the peak fault current through said first capacitor.

7. An AC fault current limiting circuit according to claim 6 in which said means comprises a non-linear resistor disposed in parallel across said first capacitor.

* * * * *